US012350901B2

(12) United States Patent
Hänninen

(10) Patent No.: US 12,350,901 B2
(45) Date of Patent: Jul. 8, 2025

(54) HYDRAULIC PRESS AND METHOD FOR PRESSING OBJECTS

(71) Applicant: MOVIATOR OY, Vaajakoski (FI)

(72) Inventor: Pertti Hänninen, Vaajakoski (FI)

(73) Assignee: MOVIATOR OY, Vaajakowski (FI)

( * ) Notice: Subject to any disclaimer, the term of this patent is extended or adjusted under 35 U.S.C. 154(b) by 146 days.

(21) Appl. No.: 17/796,642

(22) PCT Filed: Jan. 30, 2021

(86) PCT No.: PCT/FI2021/050062

§ 371 (c)(1),
(2) Date: Jul. 30, 2022

(87) PCT Pub. No.: WO2021/152219

PCT Pub. Date: Aug. 5, 2021

(65) Prior Publication Data

US 2023/0053248 A1 Feb. 16, 2023

(30) Foreign Application Priority Data

Jan. 30, 2020 (FI) .................................... 20200006

(51) Int. Cl.

*B30B 1/32* (2006.01)
*B30B 11/02* (2006.01)
*B30B 15/16* (2006.01)

(52) U.S. Cl.

CPC ................ *B30B 1/32* (2013.01); *B30B 11/02* (2013.01); *B30B 15/16* (2013.01)

(58) Field of Classification Search

CPC .. B30B 1/32; B30B 1/36; B30B 11/02; B30B 15/16; B30B 15/065; B30B 15/163;

(Continued)

(56) References Cited

U.S. PATENT DOCUMENTS 4,022,096 A * 5/1977 Forichon ............... B30B 15/163
83/639.1
8,074,557 B2 * 12/2011 Kurz ......................... F15B 9/10
91/417 R
2015/0107466 A1 * 4/2015 Kurz ..................... B30B 15/165
100/269.05

FOREIGN PATENT DOCUMENTS

GB 2062517 A 5/1981
JP 2002346655 A 12/2002

OTHER PUBLICATIONS

Applicant: MOVIATOR Oy; "Hydraulic Press and Method for Pressing Objects"; International Application No. PCT/FI2021/050062 Filed: Jan. 30, 2021; PCT International Search Report and Written Opinion; May 10, 2021; 10 pgs.

* cited by examiner

*Primary Examiner* — Jimmy T Nguyen
(74) *Attorney, Agent, or Firm* — Tarolli, Sundheim, Covell & Tummino LLP

(57) ABSTRACT

A hydraulic press and a method of pressing different kinds of objects, such as briquettes. The hydraulic press includes a body cylinder (1) housing a fluid space (2) and a working piston (3) whose rod (**3*a*) extends to the outside of the body cylinder (1), the working piston (3) being adapted to be moved in the fluid space (2) by hydraulic pressure. The hydraulic press also comprises a pressure accumulator (4) as well as a hydraulic circuit with valves. Inside the working piston (7) moved by hydraulic pressure, a striking piston (7) moving along with the working piston (3) and quickly movable relative to the working piston (3) by hydraulic pressure, is provided. In addition, a separate impact body (10) is provided between the striking piston (7) and the object (14**) pressed by the hydraulic press.

11 Claims, 2 Drawing Sheets

(58) Field of Classification Search
CPC .. B30B 15/165; F15B 1/265; F15B 2211/625; B29C 45/67
See application file for complete search history.

HYDRAULIC PRESS AND METHOD FOR PRESSING OBJECTS

This invention relates to a hydraulic press and to a method of pressing objects.

The novel hydraulic press and method according to the invention are well suited for manufacturing briquettes from purified steel slag by high-pressure compression.

BACKGROUND OF THE INVENTION

State-of-art presses operating by means of hydraulic pressure are disclosed in the British patent specification GB2062517 A, in the US patent specification US2003167938 A1 and in the Japanese patent specification JPH06-39599 A, for example.

The British patent specification GB2062517 A discloses a double-acting hydraulic press pressing the product to be made into a mold (15, 16). The apparatus has an outer press ram (3) and an inner press ram (5), both of them being moved towards the mold by the same hydraulic pressure prevailing in a shared cylinder space (1). The apparatus does not have a separate impact body hitting towards the mold at a high speed. The apparatus according to GB2062517 A also has an pressure accumulator (12) but it is intended for a purpose totally opposite to that of the solution according to this invention because it is used for slowing down the downward movement of the inner press rim towards the mold. Besides, the pressure of the pressure accumulator also raises the inner press ram (5) provided inside the outer press ram (3) to its upper position after the pressing step. This operation is also different from the solution according to the invention.

The US patent specification US2003167938 A1 discloses a very complicated and massive counter-impact press having separate inner impact bodies (15/25), the end of both of them being hit by a hydraulic ram (14/25) at accurately determined impact distances (S1/S2). The solution according to this US patent specification does not disclose a striking piston provided inside a working piston and striking against the impact body at a high power. Neither does this US patent specification give a more detailed description of how the stroke is implemented. This patent specification mentions the word "pressure accumulator" in passing, twice, but does not mention in any way what role it plays in the implementation of the stroke. Neither does this patent specification mention that, by opening the valve between the striking piston and the impact body, the pressure accumulator allows the striking piston provided inside the working piston to quickly strike against the impact body which is pressing the material in the mold.

The Japanese patent specification JPH06-39599 A is also different from the solution according to the invention. The JP patent specification discloses a cylinder (8) being reciprocally moved downwards and upwards inside a control cylinder (13) by hydraulic pressure and having, in its lower end, a pressing head (1) pressed into a mold. At the pressing step, high-pressure oil and cooling oil are initially fed, by a pump (P1), into a space (A1) provided inside the cylinder (8) and, by a pump (P2), into a space (A3) provided inside the cylinder (8), respectively. At the end of the movement, high-pressure oil is fed into both of the spaces (A1 and A3) by the pump (P1). At the pressing step, the cylinder (8) is raised to its upper position by feeding high-pressure oil, by means of the pump (P1), into a space (A2) provided inside the cylinder (8). The apparatus does not have a separate impact body hitting towards the mold at a high speed.

However, the JP patent specification mentions, once, that a hydraulic circuit provided in connection with the apparatus contains a pressure accumulator (25) but the application does not describe the use of the pressure accumulator.

BRIEF SUMMARY OF THE INVENTION

This invention aims at eliminating the problems encountered in the prior-art solutions and to provide a novel hydraulic press having a simple and inexpensive structure but exceptionally high compression pressures and powers, to allow very densified and hard briquettes, for example, to be manufactured by the press and method according to the invention. Especially, an objective of the invention is to allow very densified and hard briquettes to be pressed out of purified steel slag.

To achieve the above-mentioned objective, the solution according to the invention relates to a hydraulic press comprising a body cylinder housing a fluid space and a working piston whose rod extends to the outside of the body cylinder, the working piston being adapted to be moved in the fluid space by hydraulic pressure, the hydraulic press comprising a pressure accumulator as well as a hydraulic circuit with valves. Preferably, inside the working piston moved by hydraulic pressure, a striking piston moving along with the working piston and movable relative to the working piston by hydraulic pressure, is provided, and, between the striking piston and the object pressed by the hydraulic press, a separate impact body is provided.

The solution according to the invention also relates to a method of pressing different kinds of objects by a hydraulic press which comprises a pressure accumulator and a body cylinder housing a fluid space and a working piston whose rod extends to the outside of the body cylinder, the working piston being be moved in the fluid space which is divided into a first fluid space and a second fluid space. Preferably, the pressing operation takes place in two successive steps, the first one thereof being carried out hydraulically by moving the working piston towards the object to be pressed, and the second step is carried out by an impact body connected to the hydraulic press and receiving a quick stroke from a striking piston provided inside the working piston and brought into the striking movement by applying a substantially high pressure on the first end of the striking piston and by opening, in the fluid space preventing the striking piston from moving towards the object to be pressed, an oil supply orifice connected to a hydraulic channel.

One of the advantages of the solution according to the invention is that the apparatus can be simple and, still, the inventive structure gives the pressing head a high temporary striking speed and striking power to allow very hard and densified briquettes to be obtained from the material, preferably purified steel slag, being pressed. Likewise, the quick and powerful pressing movement provided by the press preferably allows a variety of crushable objects to be crushed.

In the following, the invention will be explained by means of a single embodiment, with reference to the accompanying schematic and simplified drawings wherein

DETAILED DESCRIPTION OF THE INVENTION

This specification assumes that the hydraulic press operates in a substantially vertical position, the pressing direction being substantially vertical and from top to bottom. Thus, the term "downwards", or the like, refers to a direction towards the mold and the material to be pressed therein, while the term "upwards", or the like, refers to the opposite direction. Accordingly, the term "below", or the like, refers to an object being positioned closer to the mold and the material to be pressed therein than an object positioned above said object.

Figure 1:
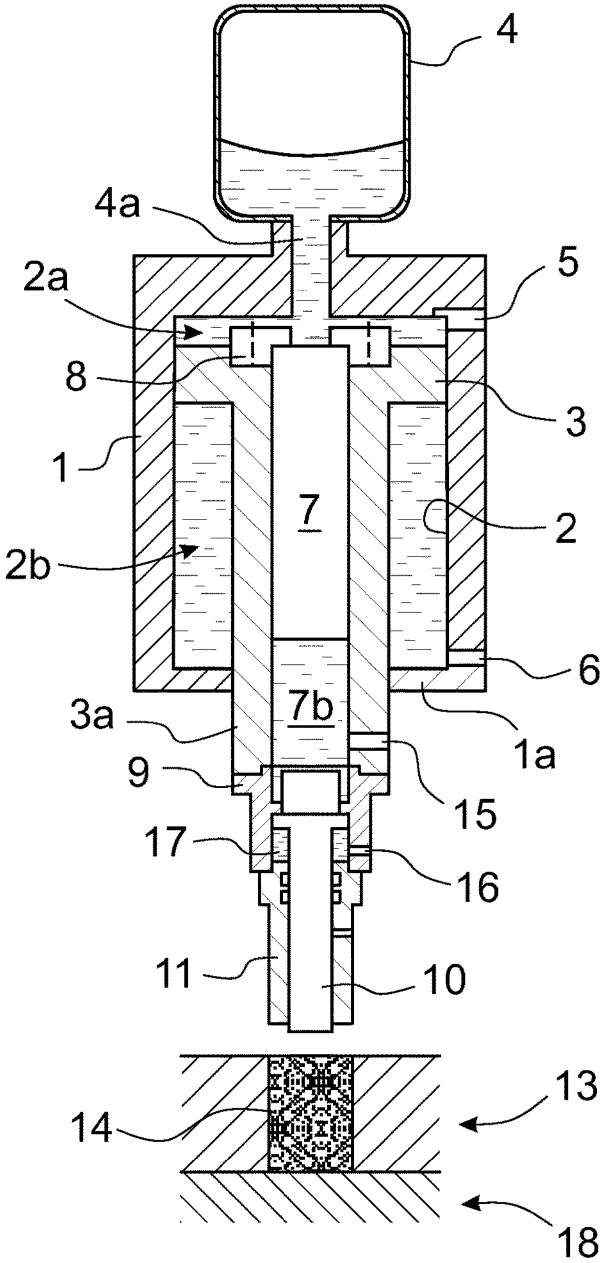
FIG. 1 is a cross-sectional and lateral view of the pressing part of a hydraulic press according to the invention, before it is activated to press.
Figure 2:
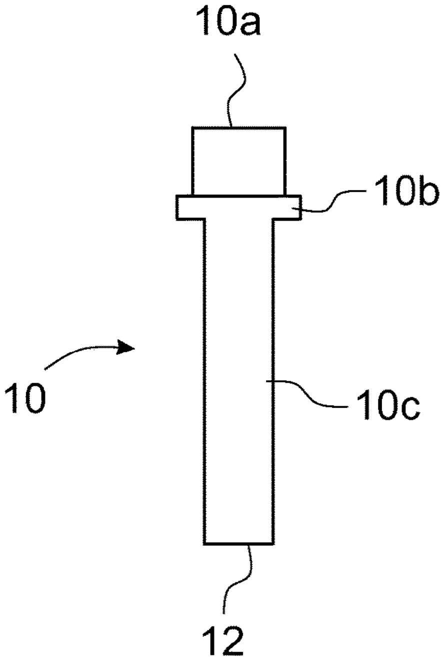
FIG. 2 is a lateral view of an impact body used in the hydraulic press according to FIG. 1.
Figure 3:
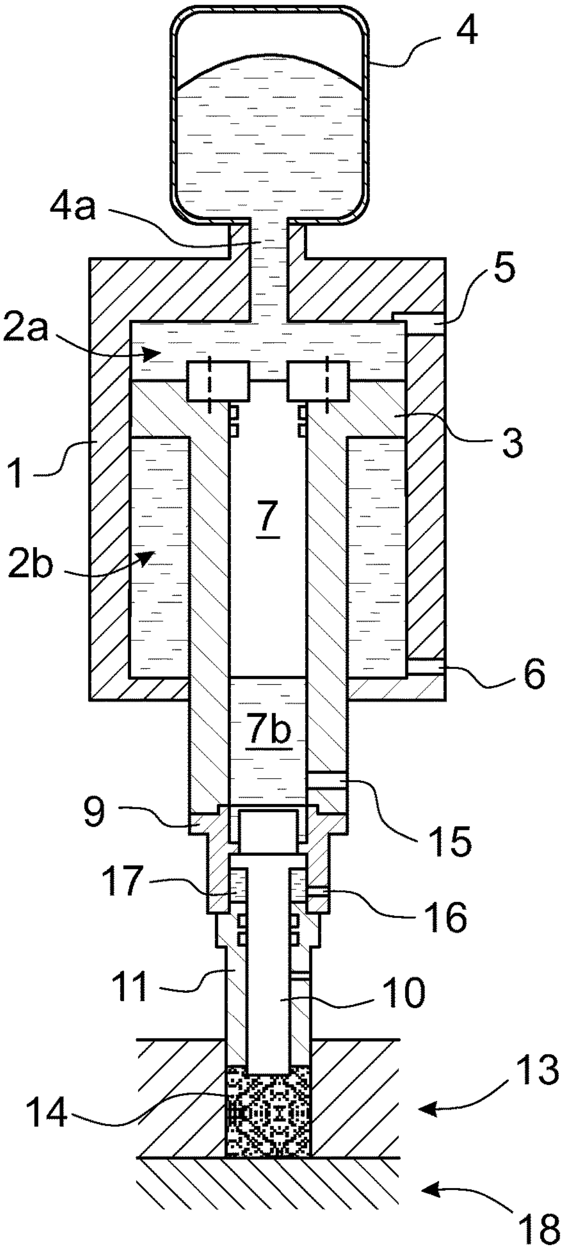
FIG. 3 is a cross-sectional and lateral view of the pressing part of the hydraulic press according to FIG. 1, in the first step of the pressing operation.
Figure 4:
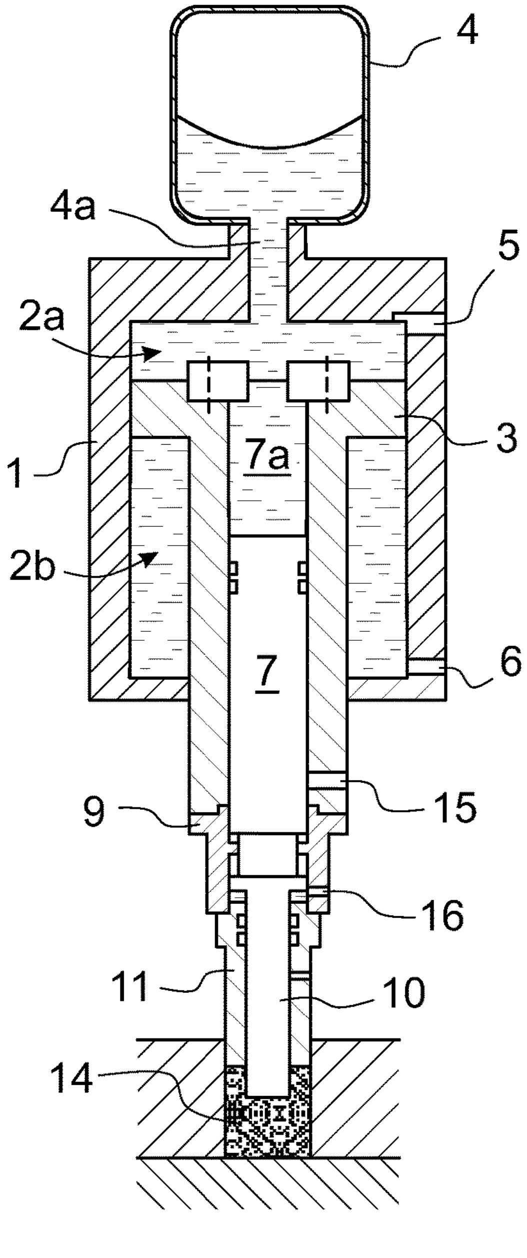
FIG. 4 is a cross-sectional and lateral view of the pressing part of the hydraulic press according to FIG. 1, in the second step of the pressing operation.

FIGS. 1, 3 and 4 show a preferable pressing part of the hydraulic press according to the invention in different steps of the pressing operation.

The central pressing part of the hydraulic press according to the invention comprises a body cylinder 1 housing a fluid space 2 and an actual working piston 3 reciprocally movable in the fluid space 2 by hydraulic pressure. Preferably, the body cylinder 1 is immobilized with respect to the frame of the press, the frame and the hoses, valves, pumps, regulators, control system or other components not being shown in the figures.

The hydraulic press also includes an pressure accumulator 4 connected to a fluid space 2*a* above the working piston 3 by a fluid channel 4*a*. A preferable position for the pressure accumulator 4 is directly on top of the body cylinder 1, for example. The top portion of the body cylinder 1, the fluid space 2*a* above the working piston 3, also is provided with a first oil flow orifice 5 to which a high-pressure hydraulic channel having a 300 bar hydraulic pressure, for example, as its working pressure, is connected. A control and shut-off valve, not shown in the figures, is provided in the high-pressure hydraulic channel. The pressure accumulator 4 being connected to the fluid space 2*a* above the working piston 3 by the fluid channel 4*a*, the pressure accumulator 4 receives, through the oil flow orifice 5, the same working pressure as the fluid space 2*a*.

A second oil flow orifice 6 is provided in the bottom portion of the body cylinder 1, in a fluid space 2*b* below the working piston 3, to which a hydraulic channel having a control and shut-off valve not shown in the figures is connected.

The tubular rod 3*a* of the working piston 3 is centrally hollow in its longitudinal direction and extends, through the bottom portion 1*a* of the body cylinder 1, farther down than the body cylinder 1. In the upper end of the working piston 3, the hollow central part of the rod 3*a* extends into the fluid space 2*a* above the working piston 3. Inside the rod 3*a*, in the hollow interior of the rod 3*a*, an elongated striking piston 7 having a cylindrical cross-section is provided to be reciprocally moved, in the hollow interior, by hydraulic pressure. The upward movement of the striking piston 7 is limited by a motion limiter 8 so as to prevent the striking piston 7 from moving upwards and out of the rod 3*a* of the working piston 3. However, as the upper end of the striking piston 7 is connected to the fluid space 2*a* above the working piston 3, the upper end of the striking piston 7 is subjected to the pressure prevailing in the fluid space 2*a*.

As a downward extension of the rod 3*a* of the working piston 3, a substantially cylindrical cylinder bushing 9 having an open lower end and housing an impact body 10, which is adapted to move reciprocally in the cylindrical cylinder bushing 9 in the longitudinal direction, is provided. The upper end of the impact body 10 is provided with an impact surface 10*a* to receive the stroke of the striking piston 7 and, below this, with a plunger part 10*b* having a cross-sectional diameter equal to the inner diameter of the cylindrical cylinder bushing 9. Below the plunger part 10*b*, a rod part 10*c* preferably smaller in diameter than the plunger part and having the pressing head 12 of the press in its lower end is provided.

In the bottom portion of the working piston 3, below the body cylinder 1, between the lower end of the striking piston 7 and the impact surface 10*a* of the impact body 10, a third oil flow orifice 15, as seen from the top of the pressing part, is provided, leading to a variable volume fluid space 7*b* housed by the rod 3*a* of the working piston 3, below the striking piston 7. The oil flow orifice 15 is connected to a hydraulic channel having a control and shut-off valve not shown in the figures.

Below the cylinder bushing 9, a guide bushing 11 is attached as an extension of the cylinder bushing 9, the rod part 10*c* extending down from the plunger part 10*b* of the impact body 10 being adapted to move reciprocally and to carry out its striking movement therein, with the result that the pressing head 12 of the impact body 10 comes out of the guide bushing 11 and hits, at a high speed and power, the material contained in the mold 13 and constituting the object 14 to be pressed.

In the cylinder bushing 9, below the plunger part 10*b* of the impact body 10, a fourth oil flow orifice 16, as seen from the top of the pressing part, is provided, leading to a fluid space 17 below the plunger part 10*b* of the impact body 10 located inside the cylinder bushing 9. The oil flow orifice 16 is connected to a hydraulic channel having a control and shut-off valve not shown in the figures.

The hollow interior of the rod 3*a* of the working piston 3, the hollow interior of the cylinder bushing 9 and the hollow interior of guide bushing 11 form together, inside the working piston 3, and the cylinder bushing and the guide bushing 11 provided as an extension thereof, a substantially continuous and concentric path acting as conductor for the reciprocal movement of the striking piston 7 and the impact body 10.

When manufacturing briquettes, for example, the mold 13 can be a substantially round disc rotatable around a vertical axis on a preferably flat and sturdy base 18 and having a plurality circumferential through-holes, similarly to the cylinder of a revolver. Each through-hole is adapted to be filled with the briquette mass making up the object 14 to be pressed and supported against the upper surface of the base 18. Depending on the mold, only one or all of the through-holes of the mold are filled at a time.

Preferably, the pressing operation of the press includes at least two steps. In the first step, the briquette material is prepressed by means of the movement of the working piston 3, while in the second step the striking piston 7 is launched, causing a stroke to complete the pressing of the briquette. Preferably, the stroke is launched automatically based on a trigger from a sensing element, such as a pressure gauge, provided in the hydraulic circuitry of the press, the pressure gauge giving, when the pressure prevailing in the fluid space 2*a* is of a predetermined magnitude, a trigger signal, and the control system of the press opens the shut-off valves of the third and fourth oil flow orifices 15 and 16. Preferably, the sensing element is controllable to allow the intensity of the stroke to be adjusted.

The pressed object constituted, for example, by a briquette pressed out of purified steel slag, is manufactured by the press and method according to the invention as follows:

As the working piston 3 and the parts attached thereto are in the upper position shown in FIG. 1, hydraulic oil having a substantially normal pressure is present in the fluid space 2*a* above the working piston 3 and in the pressure accumulator 4, which has somewhat cooled down, depending on the structure, after the fluid space 2*a* has become smaller in size as a result of the working piston's movement to its upper position. Correspondingly, the fluid space 2*b* below the working piston 3 has become larger and filled by hydraulic oil supplied through the second oil flow orifice 6 and causing the working piston's movement to its upper position. The striking piston 7 is in its upper position as well and the fluid space 7*b* between the lower surface thereof and the upper surface 10*a* of the impact body 10 is filled with hydraulic oil supplied through the third oil flow orifice 15. Likewise, the impact body 10 is in its upper position and the fluid space 17 below the plunger 10*b* thereof is filled with hydraulic oil supplied through the fourth oil flow orifice 16.

With the working piston 3 in its above-mentioned upper position, the third and fourth oil supply orifices 15 and 16 are closed and the object to be pressed, such as the briquette mass, is put into the mold, below the pressing head 12 of the press. Thereafter, hydraulic oil is fed into the oil supply orifice 5, by means of a high-pressure pump, for example, to increase the pressure in the fluid space 2*a* above the working piston 3 and in the fluid space of the pressure accumulator 4. Preferably, the pressure in the fluid space 2*a* and the fluid space of the pressure accumulator are increased up to a minimum working pressure of approximately 300 bar, for example. The increase of the pressure causes the working piston 3 and the hydraulic press parts 9, 10 and 11 attached thereto move downwards, towards the mold 13, and the impact body 10 as well as the guide bushing 11 press the object 14, such as the briquette mass, in the mold 13. The situation shown in FIG. 3 represents this step which also can be referred to as the first step of the pressing operation. The pressing movement stops by itself as the counterpressure in the material being pressed becomes high enough. Although the pressure increases in the fluid space 2*a* and the increased pressure acts on the upper surface of the striking piston 7, the movement of striking piston 7 inside the striking piston 7 is prevented with respect to the striking piston 7 since the fluid space 7*b* below the striking piston 7 is filled with hydraulic fluid which neither is pressed together nor can come out of the fluid space 7*b*, due to the fact that the valve of the hydraulic channel provided in connection with the oil flow orifice 15 is closed.

This continues with the situation shown in FIG. 4, i.e. the second step of the pressing operation, where the third and fourth oil supply orifices 15 and 16, i.e. the shut-off valves provided in the hydraulic channels leading thereto, are opened. In practice, this opening takes place automatically after the pressure prevailing in the fluid space 2*a* has increased to a predetermined magnitude and the pressure gauge acting as the sensing element has given the control system a command to open the shut-off valves of the third and fourth oil supply orifices 15 and 16. Now, the hydraulic oil present in the fluid spaces 7*b* and 17 and retaining the striking piston 7 and the impact body 10 in place with respect to the working piston 3 is discharged, through the oil flow orifices 15 and 16, from front of the striking piston 7 and the ram 10, resulting in that the pressure in the fluid space 2*a* is very quickly released, assisted by the pressure of the pressure accumulator 4, into the variable volume fluid space 7*a* provided in the upper end of the rod 3*a* of the working piston 3, and the striking piston 7 strikes against the impact body 10 at a very high speed and power, due to its inertia force and the working pressure of the pressure accumulator 4. As a result thereof, the pressing head 12 of the impact body 10 hits the object 14, such as the briquette mass, to be pressed and provided in the mold 13, causing it to be pressed together further and packed into a compact and hard briquette by the shaping action of the pressing head 12 of the impact body 10. When pressing briquettes, preferably, a suitable binder, such as cement, bentonite and/or lime, can be mixed into the briquette mass.

After the pressing stroke, the working piston 3 and the components attached thereto are lifted up and out of the mold by feeding hydraulic oil into the fluid spaces 2*b*, 7*b* and 17, at a sufficient pressure, through the oil supply orifices 6, 15 and 16. Thereafter, the pressed briquette is removed from the mold 13, preferably by rotating the mold disc, for example, until the briquette can be dropped, through the mold disc, down under the mold disc. The next pressing event can be initiated by rotating the mold disc until the next object 14 to be pressed is situated below the pressing head 12.

It will be appreciated by a person skilled in the art that the different embodiments are not solely restricted to the examples above but may vary within the accompanying claims. What is essential is that a very quick and powerful stroke against an impact body hitting the object to be pressed is accomplished by hydraulic pressure.

It will also be appreciated by the person skilled in the art that the press according to the invention can press not only briquettes but also other kinds of objects. As an example, the press can make molded products, such as wooden, plastic or metallic products. Likewise, the press according to the invention can also be used, in the same way as an impact machine, for crushing separate bodies or breaking apart a continuous material layer.

The invention claimed is:

1. A hydraulic press comprising a body cylinder (1) housing a fluid space (2) with a first fluid space (2*a*) and a second fluid space (2*b*) and a working piston (3) whose rod (3*a*) extends to an outside of the body cylinder (1), the working piston (3) being adapted to be moved in the fluid space (2) by hydraulic pressure, the hydraulic press comprising a pressure accumulator (4), and inside the working piston (3) moved by hydraulic pressure, a striking piston (7) moving along with the working piston (3) and movable relative to the working piston (3) by hydraulic pressure, is provided, and in that, between the striking piston (7) and an object (14) pressed by the hydraulic press, a separate impact body (10) is provided, wherein inside the rod (3*a*) of the working piston (3), between the striking piston (7) and the impact body (10), a variable volume fluid space (7*b*) is provided, having an oil flow orifice (15) connected to a hydraulic channel to fill the variable volume fluid space (7*b*) for the purpose of moving the striking piston (7) to its striking position and to empty the variable volume fluid space (7*b*) for the purpose of carrying out a striking movement of the striking piston (7).

2. The hydraulic press according to claim 1, wherein the fluid space (2) of the body cylinder (1) comprises the first fluid space (2*a*) on a first side of the working piston (3) and the second fluid space (2*b*) on a second side of the working piston (3), and in that the pressure accumulator (4) is hydraulically connected to the first fluid space (2*a*) of the body cylinder (1).

3. The hydraulic press according to claim 2, wherein for the purpose of moving the working piston (3) towards the object (14) to be pressed, the first fluid space (2*a*) has an oil flow orifice (5) connected, by a hydraulic channel, to a high-pressure hydraulic pump, and in that, for the purpose of moving the working piston (3) away from the object (14) to be pressed, the second fluid space (2*b*) has a second oil flow orifice (6), connected, by a hydraulic channel, to a hydraulic pump.

4. The hydraulic press according to claim 1, wherein the rod (3*a*) of the working piston (3) is a hollow, tubular structure whose one end extends to the outside of the body cylinder (1) and whose other end is extended by a cylinder bushing (9) and a guide bushing (11) concentric with the rod (3*a*) and intended to guide the impact body (10) to hit the object (14) to be pressed, as a result of the stroke of the striking piston (7).

5. The hydraulic press according to claim 4, wherein the cylinder bushing (9) houses a fluid space (17) having an oil flow orifice (16) connected to a hydraulic channel to fill the fluid space (17) for the purpose of moving the impact body (10) to its hitting position and to empty the fluid space (17) for the purpose of carrying out a hitting movement of the impact body (10).

6. The hydraulic press according to claim 1, wherein the first end of the rod (3*a*) of the working piston (3) houses a variable volume fluid space (7*a*) connected to the first fluid space (2*a*) and adapted to be filled with hydraulic oil discharged from the first fluid space (2*a*) and the pressure accumulator (4) to accomplish the striking movement of the striking piston (7).

7. A method of pressing objects by a hydraulic press comprising a pressure accumulator (4) and a body cylinder (1) housing a fluid space (2) with a first fluid space (2*a*) and a second fluid space (2*b*) and a working piston (3) whose rod (3*a*) extends to an outside of the body cylinder (1), the working piston (3) being adapted to be moved in the fluid space (2) divided into the first fluid space (2*a*) and the second fluid space (2*b*), wherein pressing takes place in two successive steps, the first one thereof being carried out hydraulically by the movement of the working piston (3), and the second step be carried out by an impact body (10) connected to the hydraulic press and receiving a quick stroke from a striking piston (7) provided inside the working piston (3) and brought into a striking movement by applying a substantially high pressure from the first fluid space (2*a*) on a first end of the striking piston (7) and by opening to a hydraulic channel connected to an oil supply orifice (15) in a fluid space (7*b*) which prevents the striking piston (7) from moving towards an object (14) to be pressed.

8. The method according to claim 7, wherein in the step of carrying out the striking movement of the striking piston (7), first, an oil supply orifice (16) provided in a fluid space (17) preventing the impact body (10) from moving towards the object (14) to be pressed and connected to a hydraulic channel is opened, and simultaneously therewith, or thereafter, the oil supply orifice (15) provided in the fluid space (7*b*) is opened.

9. The method according to claim 8, wherein at the beginning of the pressing step, the pressure acting on the first end of the striking piston (7) inside the working piston (3) is increased, both in the first fluid space (2*a*) and in the pressure accumulator (4) hydraulically connected thereto, and, at the same time, the working piston (3), and, along therewith, the striking piston (7), as well as the impact body (10) are moved towards the object (14) to be pressed, whereafter a quick striking movement of the striking piston (7) is executed by opening the oil supply orifices (15) and (16).

10. The method according to claim 8, wherein the pressure acting on the first end of the striking piston (7) is measured by a sensing element and, when the pressure exceeds a predetermined limit, the quick striking movement of the striking piston (7) is launched by opening the oil supply orifices (15) and (16).

11. The method according to claim 8, wherein for a next pressing event, the working piston (3), the striking piston (7) and the impact body (10) are returned to their initial position by filling the fluid spaces through the oil supply orifices.

* * * * *